(12) United States Patent
Kohno

(10) Patent No.: US 7,776,258 B2
(45) Date of Patent: Aug. 17, 2010

(54) HYDROGEN STORAGE ALLOY, HYDROGEN SEPARATION MEMBRANE, HYDROGEN STORAGE TANK, AND HYDROGEN ABSORPTION AND DESORPTION METHOD

(75) Inventor: Tatsuoki Kohno, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 513 days.

(21) Appl. No.: 11/856,211

(22) Filed: Sep. 17, 2007

(65) Prior Publication Data
US 2008/0156392 A1    Jul. 3, 2008

(30) Foreign Application Priority Data
Sep. 29, 2006    (JP) ............... 2006-267982

(51) Int. Cl.
*C22C 30/00* (2006.01)
*H01M 4/38* (2006.01)

(52) U.S. Cl. ............... 420/580; 420/900; 429/218.2

(58) Field of Classification Search ......... 420/402–415, 420/441–460, 580, 900; 429/218.2; 220/581–592
See application file for complete search history.

(56) References Cited

U.S. PATENT DOCUMENTS

| 6,726,892 B1 | 4/2004 | Au | 423/644 |
| 2005/0112018 A1* | 5/2005 | Schulz et al. | 420/455 |

FOREIGN PATENT DOCUMENTS

| JP | 63-162884 | 7/1988 |
| JP | 9-49040 | 2/1997 |
| JP | 11-29832 | 2/1999 |
| JP | 2000-188105 | * 7/2000 |
| JP | 2000-281301 | 10/2000 |
| JP | 2001-223000 | 8/2001 |
| JP | 2001-325957 | 11/2001 |
| JP | 2002-164045 | 6/2002 |

OTHER PUBLICATIONS

U.S. Appl. No. 11/689,086, filed Mar. 21, 2007, Tatuoki Kohno.
Chen, et al., "*Interaction of hyrdrogen with mnetal nitrides and imides*", Nature, vol. 420, Nov. 21, 2002, pp. 302-304.

* cited by examiner

*Primary Examiner*—George Wyszomierski
*Assistant Examiner*—Mark L Shevin
(74) *Attorney, Agent, or Firm*—Ohlandt, Greeley, Ruggiero & Perle, L.L.P.

(57) ABSTRACT

A hydrogen storage alloy includes a composition defined by the following formula $(Ca_{1-X}L_X)(Li_{1-Y-Z}M_YNi_Z)_m$, wherein the L denotes one or more elements selected from the group consisting of Na, K, Rb, Cs, Mg, Sr, Ba, Sc, Ti, Zr, Hf, V, Nb, Ta, La, Ce, Pr, Nd, Pm, Sm, Eu, Gd, Tb, Dy, Ho, Er, Tm, Yb, and Lu, the M denotes one or more elements selected from the group consisting of Cr, Mo, W, Mn, Fe, Ru, Co, Ir, Ni, Pd, Pt, Cu, Ag, Au, Zn, Cd, B, Al, Ga, In, Si, Ge, Sn, Pb, Sb, Bi, and S, and the mole ratios X, Y, Z, and m respectively satisfy the following $0<X\leq0.4$, $0\leq Y\leq0.4$, $0.1\leq Z\leq0.4$, and $1.8\leq m\leq2.2$.

12 Claims, 2 Drawing Sheets

HYDROGEN STORAGE ALLOY, HYDROGEN SEPARATION MEMBRANE, HYDROGEN STORAGE TANK, AND HYDROGEN ABSORPTION AND DESORPTION METHOD

CROSS-REFERENCE TO RELATED APPLICATIONS

This application is based upon and claims the benefit of priority from prior Japanese Patent Application No. 2006-267982, filed Sep. 29, 2006, the entire contents of which are incorporated herein by reference.

BACKGROUND OF THE INVENTION

1. Field of the Invention

The present invention relates to a hydrogen storage alloy, a hydrogen separation membrane, a hydrogen storage tank, and a hydrogen absorption and desorption method to be used for storing, transporting, and separating hydrogen.

2. Description of the Related Art

A hydrogen storage alloy is an alloy capable of safely and easily storing hydrogen as an energy source and has been highly expected as a new energy conversion and storage material. The application fields of the hydrogen storage alloy as an innovative functional material are wide in a range such as storage and transportation of hydrogen, storage and transportation of heat, heat-mechanical energy conversion, separation and refining of hydrogen, separation of hydrogen isotope, batteries using hydrogen as an active material, catalysts in synthetic chemistry, and temperature sensors.

Further, in recent years, because of properties such as high capacity, durability to overcharging and over-discharging, highly efficient chargeability and dischargeability, cleanliness, and compatibility with nickel cadmium batteries, nickel metal hydride secondary batteries using hydrogen storage alloys as a negative electrode material have been expected as promising batteries for civil use in the next generation and their applications and materializations have been actively promoted. As described, the hydrogen storage alloys seem to be suitable for various mechanical, physical, and chemical applications and are among one of key materials in future industrial fields.

Metals that absorb hydrogen react with hydrogen while generating heat. That is, these metal elements are either used as a simple substance (e.g., Pd, Ti, Zr, V, as well as noble earth metal elements and alkaline earth metals) capable of forming stable compounds with hydrogen, or used as alloys with other metals.

Advantageous points of alloying are that the metal-hydrogen bonding power can be properly lowered to relatively easily cause not only absorption reaction but also desorption reaction, that absorption/desorption reactivity relevant to the extent of the equilibrium hydrogen pressure (plateau pressure) necessary for reaction, the equilibrium range (plateau range), and alteration of equilibrium pressure in the hydrogen storage can be improved, and that chemical and physical stability can be improved.

Hydrogen storage alloy types known so far are the following 1) to 5):

1) Rare earth type ($LaNi_5$, $MmNi_5$, or the like)
2) Laves type ($ZrV_2$, $ZrMn_2$, or the like)
3) Titanium type (TiNi, TiFe, or the like)
4) Magnesium type ($Mg_2Ni$, $MgNi_2$, or the like)
5) Others (cluster alloys etc.).

Although practically used as a material for batteries, the above-mentioned alloy system type 1) has a discharge capacity of 80% or higher of the theoretical capacity and is thus limited in the further improvement of the capacity.

H. Oesterreicher, et al., J. Less-Common Met., 73, 339 (1980) incorporated by reference reported a large quantity of hydrogen gas storage in magnesium-rare earth metal alloys, which are the above-mentioned alloy type 4). However, for example, it is pointed out that a $La_{1-x}Mg_xNi_2$ type alloy among these alloys has a problem of a very low hydrogen releasing speed due to high stability of the alloy with hydrogen.

As described, although having a high hydrogen storage capacity in vapor phase, the magnesium alloy of the above-mentioned type 4) is decomposed simultaneously with formation of stable hydride at the time of absorption and is therefore capable of releasing hydrogen in an extremely small quantity and scarcely working as a hydrogen storage material.

K. Aoki, X. G. Li, and T. Matsumoto, Acta Metall Mater., 40, 1717 (1992) incorporated by reference describes some of hydrogen storage alloys having the Laves structure become amorphous or heterogeneous due to hydrogen absorption.

BRIEF SUMMARY OF THE INVENTION

A hydrogen storage alloy according to the present invention includes a composition defined by the following formula: $(Ca_{1-X}L_X)(Li_{1-Y-Z}M_YNi_Z)_m$, wherein the L denotes one or more elements selected from the group consisting of Na, K, Rb, Cs, Mg, Sr, Ba, Sc, Ti, Zr, Hf, V, Nb, Ta, La, Ce, Pr, Nd, Pm, Sm, Eu, Gd, Tb, Dy, Ho, Er, Tm, Yb, and Lu; the M denotes one or more elements selected from the group consisting of Cr, Mo, W, Mn, Fe, Ru, Co, Ir, Ni, Pd, Pt, Cu, Ag, Au, Zn, Cd, B, Al, Ga, In, Si, Ge, Sn, Pb, Sb, Bi, and S; and the mole ratios X, Y, Z, and m respectively satisfy the following: $0<X \leq 0.4$, $0 \leq Y \leq 0.4$, $0.1 \leq Z \leq 0.4$, and $1.8 \leq m \leq 2.2$.

A hydrogen absorption and desorption method according to the present invention comprises: storing a hydrogen storage alloy powder in the inside of a pressure vessel having a hydrogen gas lead-in port; introducing hydrogen gas or hydrogen-containing gas at a predetermined pressure and temperature into the pressure vessel through the lead-in port to absorb the hydrogen gas or hydrogen-containing gas in the hydrogen storage alloy; and desorbing hydrogen from the hydrogen storage alloy under predetermined pressure and temperature conditions, the hydrogen storage alloy including a composition defined by the following formula: $(Ca_{1-X}L_X)(Li_{1-Y-Z}M_YNi_Z)_m$, wherein the L denotes one or more elements selected from the group consisting of Na, K, Rb, Cs, Mg, Sr, Ba, Sc, Ti, Zr, Hf, V, Nb, Ta, La, Ce, Pr, Nd, Pm, Sm, Eu, Gd, Tb, Dy, Ho, Er, Tm, Yb, and Lu; the M denotes one or more elements selected from the group consisting of Cr, Mo, W, Mn, Fe, Ru, Co, Ir, Ni, Pd, Pt, Cu, Ag, Au, Zn, Cd, B, Al, Ga, In, Si, Ge, Sn, Pb, Sb, Bi, and S; and the mole ratios X, Y, Z, and m respectively satisfy the following: $0<X \leq 0.4$, $0 \leq Y \leq 0.4$, $0.1 \leq Z \leq 0.4$, and $1.8 \leq m \leq 2.2$.

DETAILED DESCRIPTION OF THE INVENTION

Figure 1:
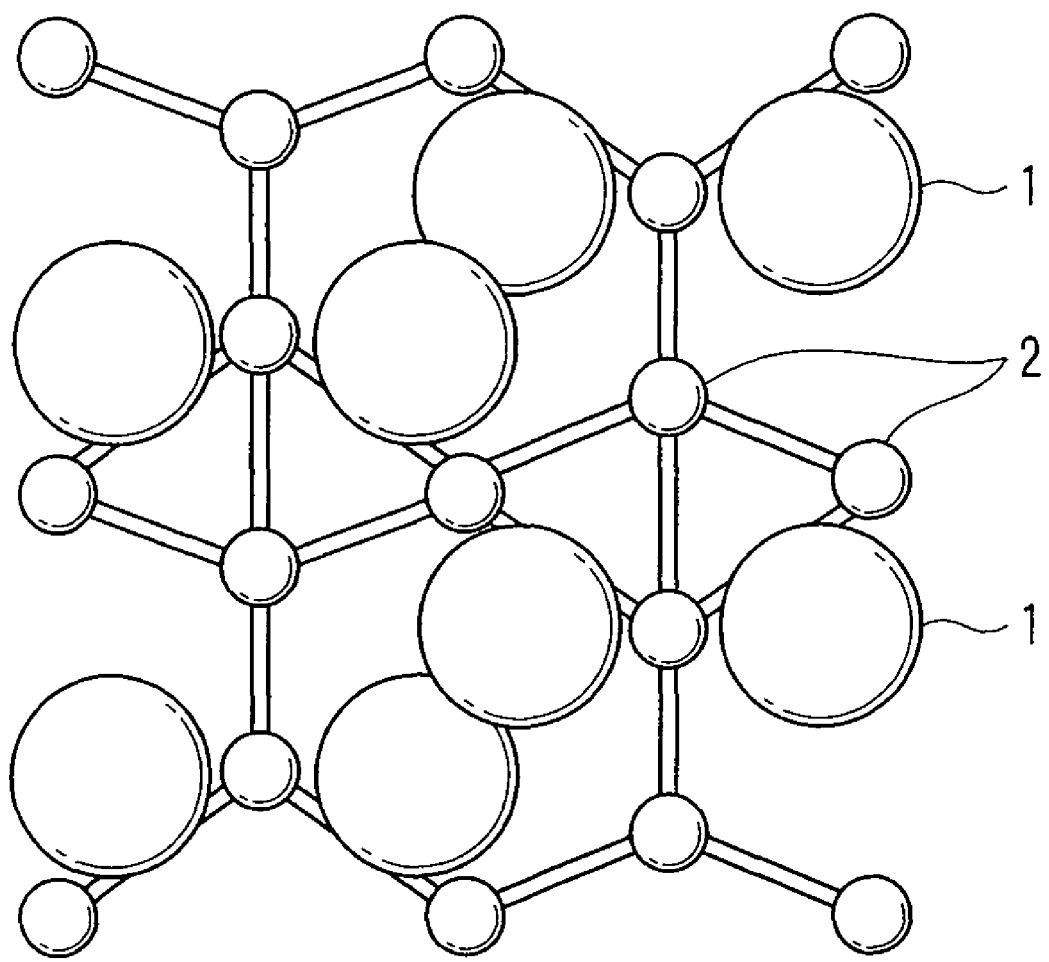
FIG. 1 is a schematic view showing a hexagonal crystal structure of $MgZn_2$ type alloy.

Hereinafter, various embodiments of the invention will be described.

First Embodiment

Hydrogen Storage Alloy

A hydrogen storage alloy according to the invention has a composition defined by the following formula (1).

$$(Ca_{1-X}L_X)(Li_{1-Y-Z}M_YNi_Z)_m \qquad (1)$$

In the above formula (1), the component L denotes one or more elements selected from the group consisting of Na, K, Rb, Cs, Mg, Sr, Ba, Sc, Ti, Zr, Hf, V, Nb, Ta, La, Ce, Pr, Nd, Pm, Sm, Eu, Gd, Tb, Dy, Ho, Er, Tm, Yb, and Lu. The component M denotes one or more elements selected from the group consisting of Cr, Mo, W, Mn, Fe, Ru, Co, Ir, Ni, Pd, Pt, Cu, Ag, Au, Zn, Cd, B, Al, Ga, In, Si, Ge, Sn, Pb, Sb, Bi, and S.

The mole ratios X, Y, Z, and m respectively satisfy the following: $0<X\leq0.4$, $0\leq Y\leq0.4$, $0.1\leq Z\leq0.4$, and $1.8\leq m\leq 2.2$. The reason why the substitution ratio X of the component L is defined as $0<X\leq0.4$ is because if the substitution ratio X exceeds 0.4, the alloy decomposition occurs to considerably lower the hydrogen desorption capacity. The range of the substitution ratio X is more preferably $0.1\leq X\leq 0.3$. It is because if the substitution ratio X of the component L is lower than 0.1, hydrogen in the alloy is more stabilized. Further, it is because if the substitution ratio X of the component L exceeds 0.3, the crystal structure is significantly changed.

In consideration of the cost reduction of the alloy, it is preferable to use one or more elements selected from the group consisting of Mg, Ti, Zr, V, Nb, La, and Y for the component L. Among these elements, it is more preferable to use Mg, Ti, Zr, and V as the alloying element.

In the above formula (1), the substituent element M denotes one or more elements selected from the group consisting of Cr, Mo, W, Mn, Fe, Ru, Co, Ir, Ni, Pd, Pt, Cu, Ag, Au, Zn, Cd, B, Al, Ga, In, Si, Ge, Sn, Pb, Sb, Bi, and S and this substitution improves the hydrogen absorption and desorption properties such as hydrogen absorption and desorption speed of the alloy. It is supposedly attributed to the fact that the substitution of the component M facilitates diffusion of hydrogen in the alloy or absorption and desorption of hydrogen.

The reason why the substitution ratio Y of the component M is defined as $0\leq Y\leq 0.4$ is because if the substitution ratio Y exceeds 0.4, the hydrogen desorption capacity is decreased. The range of the substitution ratio Y is more preferably $0.1\leq Y\leq 0.3$. It is because if the substitution ratio Y is lower than 0.1, the effect of the stress in the crystal inside such as expansion and strain is lessened. Further, it is because if the substitution ratio Y exceeds 0.3, the solid solution in the alloy becomes difficult.

The reason why the substitution ratio Z is defined as $0.1\leq Z\leq 0.4$ is because if the substitution ratio Z exceeds 0.4, the crystal lattice is so shrunk as to make hydrogen absorption considerably difficult. The range of the substitution ratio Z is more preferably $0.15\leq Z\leq 0.3$. It is because if the substitution ratio Z is lower than 0.15, the catalytic activity for hydrogen is deteriorated. Further, it is because if the substitution ratio Z exceeds 0.3, hydride formation energy is further lowered.

In the above-mentioned formula (1), the mole ratio m of $(Ca_{1-X}L_X)$ and $(Li_{1-Y-Z}M_YNi_Z)$ is controlled to be in the range of $1.8\leq m\leq 2.2$, so that high hydrogen absorption capacity is kept high and at the same time a problem of the difficulty of hydrogen desorption can be improved. Accordingly, it is made possible to obtain a hydrogen storage alloy capable of exhibiting further increased discharge capacity. If the mole ratio m is out of the range of $1.8\leq m\leq 2.2$, the hydrogen desorption property of the alloy cannot be improved to result in difficulty of further increase of desorption capacity. The range of the mole ratio m is more preferably in the range of $1.9\leq m\leq 2.1$.

It is also because if the mole ratio m becomes lower than 1.9, it becomes difficult to maintain the crystal structure. Further, it is if the mole ratio m exceeds 2.1, the hydrogen absorption amount is considerably decreased.

As described above, the hydrogen storage alloy according to the invention is provided with remarkably improved hydrogen absorption and desorption properties such as hydrogen absorption and desorption speed and a large discharge capacity.

The hydrogen storage alloy may contain elements such as C, N, P, and F as impurities to an extent that the alloy properties (e.g., hydrogen absorption property, hydrogen desorption property, hydrogen absorption and desorption cycle property) are not interfered. The content of each of these impurity elements is preferably suppressed to 1% by mass or less. Herein, "the hydrogen absorption and desorption cycle property" means a capability of the alloy on the basis of the number of the repeating times until the hydrogen absorption and desorption amounts respectively become below predetermined threshold values when hydrogen absorption and desorption are repeated for the alloy. As the number of the repeating times is higher, the alloy is more excellent in the hydrogen absorption and desorption cycle property.

Further, it is desirable that the hydrogen storage alloy is contained at a ratio of 70% by volume or more in a mother alloy. If the ratio of the alloy phase is lower than 70% by volume, a large quantity of foreign phases is precipitated and the capability of the alloy as the hydrogen storage material is decreased and therefore, it is not preferable.

The hydrogen storage alloy is preferable to have a hexagonal crystal system with a space group of $P6_3/mmc$. Among crystal systems, A3 type, A9 type, C7 type, C14 type, and C36 type structures are particularly preferable. Due to the hexagonal system as well as the symmetry of the above-mentioned space group $P6_3/mmc$, hydrogen can be absorbed and desorbed smoothly and quickly.

Further, the hydrogen storage alloy is preferable to have a Laves structure of C14 type crystal. K. Aoki, X. G. Li, and T. Matsumoto, Acta Metall Mater., 40, 1717 (1992) incorporated by reference describes that a portion of the hydrogen storage alloy having the Laves structure becomes amorphous or heterogeneous due to hydrogen absorption.

On the other hand, with respect to the hydrogen storage alloy of the invention, the crystal is not broken even if the alloy absorbs hydrogen and the alloy is capable of easily absorbing and desorbing hydrogen. With respect to the C14 type crystal Laves structure, it is desirable for the alloy to have $MgZn_2$ type with particularly high symmetry as shown in FIG. 1. It is because if the symmetry of the crystal is high, hydrogen absorption and desorption becomes smooth.

The hydrogen storage alloy of the invention is further preferable to be the $MgZn_2$ type and have a composition ratio of Ca:Li:Ni=1:1.5:0.5 for the mother structure. This is because if the mother structure has a composition ratio of Ca:Li:Ni=1: 1.5:0.5, the symmetry of the crystal is improved to the highest degree. With respect to the C14 type crystal Laves structure of $MgZn_2$ type shown in FIG. 1, Mg site 1 is positioned at 4f of the hexagonal crystal system and Zn site 2 is positioned at 2a and 6h. In the case of the hydrogen storage alloy defined by the general formula $(Ca_{1-X}L_X)(Li_{1-Y-Z}M_YNi_Z)_m$, Ca atom or Li atom is positioned at the Mg site 1 in FIG. 1 and Ni atom or Li atom is positioned at the Zn site 2.

Further, in the hydrogen storage alloy according to this embodiment, it is preferable that the lattice constants "a" and "c" are respectively in the following ranges: $5 Å \leq a \leq 7 Å$ and $9 Å \leq c \leq 11 Å$. If the lattice constants "a" and "c" are out of the ranges, it may become difficult to form the crystal lattice and therefore it becomes impossible to obtain sufficient hydrogen storage property. The lattice constants "a" and "c" are more preferably in the ranges of: $5.5 Å \leq a \leq 6.5 Å$ and $9.5 Å \leq c \leq 10.5 Å$.

The hydrogen storage alloy of this embodiment is produced by the following method.

Starting materials of the respective elements are weighted and melted by high frequency induction heating under an inert atmosphere and cast by dies to obtain an ingot. After the alloy ingot is obtained, the ingot may be quenched. Further, mother alloys may be produced by high frequency induction melting and successively, the respective mother alloys are weighted to adjust the aimed composition and melted by high frequency induction heating to produce an alloy ingot. After the alloy ingot production, quenching may be carried out. Thereafter, the obtained alloy is subjected to relatively long heat treatment at a temperature of 100° C. or more and lower than 1000° C., preferably 100° C. to 800° C., for 1 to 100 hours, preferably 10 to 80 hours in vacuum or under an inert atmosphere, to improve the hydrogen absorption and desorption properties (e.g., hydrogen absorption and desorption speed) of the hydrogen storage alloy. If the heat treatment is carried out at 1000° C. or higher, the alloy phase is decomposed and the hydrogen absorption property is considerably deteriorated. The hydrogen absorption and desorption properties can be evaluated by differential heat/thermogravimetric analysis.

In the hydrogen storage alloy according to this embodiment, the hydrogen desorption property is considerably improved, as shown in Examples 1 to 18 in Table 1.

Second Embodiment

Hydrogen Separation Membrane

The hydrogen storage alloy according to the first embodiment can be formed in a film-like shape by heat press process. The film-like hydrogen storage alloy functions as a hydrogen separation membrane having hydrogen absorption and desorption properties.

The hydrogen separation membrane may contain an alloy other than the hydrogen storage alloy. It is desirable that the hydrogen storage alloy is contained at a ratio of 70% by volume or more in the hydrogen separation membrane. This is because if the ratio of the hydrogen storage alloy is lower than 70% by volume, a large quantity of foreign phases is precipitated and the capability as the hydrogen storage material is deteriorated.

Figure 2:
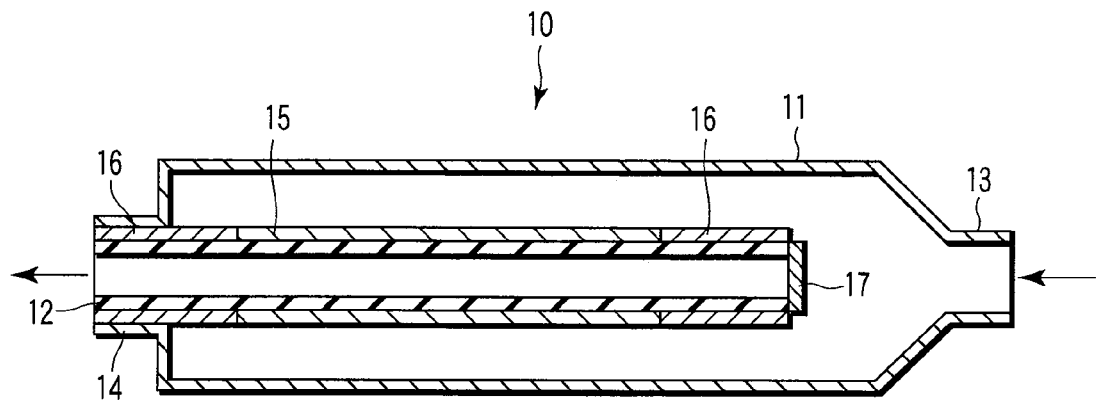
FIG. 2 is a schematic cross-sectional view showing an apparatus having a hydrogen separation membrane according to an embodiment.

Next, a hydrogen separation apparatus equipped with the hydrogen separation membrane according to the second embodiment will be described with reference to FIG. 2.

A hydrogen separation apparatus 10 includes a high pressure tube 11 and a low pressure tube 12. The high pressure tube 11 has an aperture part with a gradually narrowed diameter in one end and this aperture part is a raw material gas introduction part 13. The high pressure tube 11 has another aperture part with a small diameter in the other end and this aperture part is a refined gas lead-out part 14. The low pressure tube 12 is made of a porous ceramic. Porous alumina is most preferable as the porous ceramic. The center part (main part) of the outer circumferential face of the low pressure tube 12 is covered with a hydrogen separation membrane 15. Both end parts of the outer circumferential face of the low pressure tube 12 which are not covered with the hydrogen separation membrane 15 are covered with a metal membrane 16. A film of a metal having low reactivity with a mixture gas to be introduced may be used as the metal membrane 16. Further, the low pressure tube 12 is closed in one end by a metal membrane 17 similar to the metal membrane 16. A membrane containing the hydrogen storage alloy of the first embodiment is used as the hydrogen separation membrane 15.

The low pressure tube 12 is inserted into the high pressure tube 11 from the refined gas lead-out part 14 of the high pressure tube 11. Inside the high pressure tube 11, the closed side of the low pressure tube 12 faces to the mixture gas introduction part 13 and the opened side faces to the refined gas lead-out part 14. The outer circumferential face of the metal membrane 16 covering the periphery of the aperture edge of the low pressure tube 12 and the inner circumferential face of the refined gas lead-out part 14 of the high pressure tube 11 are closely stuck to each other.

At the time of using the hydrogen separation apparatus 10, the space between the low pressure tube 12 and the high pressure tube 11 is set to be a high pressure part and the space inside the low pressure tube 12 is set to be a low pressure part. A mixture gas containing hydrogen gas is supplied to the high pressure part from the raw material gas introduction part 13. The gas flow direction is shown as an arrow in FIG. 2. The hydrogen gas component in the mixture gas is stored in the hydrogen separation membrane 15. The hydrogen gas component stored in the hydrogen separation membrane 15 penetrates the wall face of the low pressure tube 12 and moves to the low pressure part. In the refined gas lead-out part 14, the refined hydrogen gas is taken out of the aperture end of the low pressure tube 12.

Since the hydrogen separation membrane of this embodiment is excellent in the hydrogen absorption and desorption properties, the membrane can improve the hydrogen separation efficiency in the hydrogen separation apparatus.

Third Embodiment

Hydrogen Storage Tank

Figure 3:
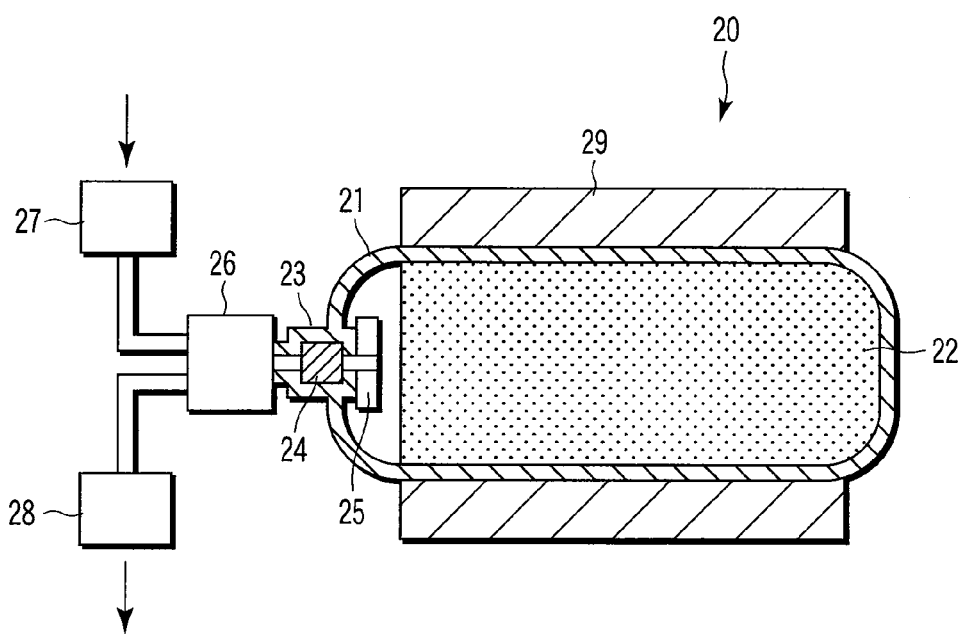
FIG. 3 is a block cross-sectional view of a hydrogen storage tank according to an embodiment.

As shown in FIG. 3, a hydrogen storage tank 20 according to a third embodiment includes a pressure vessel 21 and a hydrogen storage alloy powder 22. The hydrogen storage alloy powder 22 is packed and sealed in the inside of the pressure vessel 21. A powder obtained by crushing and finely pulverizing the hydrogen storage alloy of the first embodiment is used as the hydrogen storage alloy powder 22. The average particle diameter of the hydrogen storage alloy powder 22 is adjusted to be 20 μm. The pressure vessel 21 has an inlet 23 for hydrogen gas and the inlet 23 is equipped with a tank valve 24. Such a hydrogen storage tank 20 can be employed while being incorporated into a hydrogen storage system to be built in, for example, a vehicle.

The tank valve 24 is installed in one end side of the pressure vessel 21 and a filter 25 is attached to the tank valve 24. The filter 25 is for preventing the hydrogen storage alloy powder 22 from being discharged to the outside from the inside of the pressure vessel 21. Hydrogen is absorbed in or desorbed from the hydrogen storage alloy powder 22 in the pressure vessel 22 through the tank valve 24. A hydrogen supply port 27 and a hydrogen release port 28 are connected to the tank valve 24 respectively through pipes. A pressure adjuster 26 is attached at each of these connection parts to adjust the pressure at the time of absorption and desorption of hydrogen.

The pressure vessel 21 in this embodiment is a container having an approximately rectangular parallelepiped shape and has a hydrogen storage space inside. The pressure vessel 21 may have various structures other than the rectangular parallelepiped shape having the simple closed space and may have a structure having ribs and columns. The pressure vessel 21 is preferably made of a material having sufficient strength and chemical stability to withstand the load at the time of hydrogen absorption and desorption. Examples of a material for the pressure vessel 21 may include aluminum, a stainless steel, and a carbon structural material. In this embodiment, the pressure vessel 21 made of a stainless steel is employed.

In addition, although the hydrogen supply port 27 and the hydrogen release port 28 are separate components in this embodiment, the apparatus may have a hydrogen supply and release port having the functions of both ports.

Heat is generated at the time of hydrogen absorption, and heat is absorbed at the time of hydrogen desorption. Therefore, a temperature adjuster 29 may be attached to the outside of the pressure vessel 21 if necessary. The hydrogen absorption and desorption speed and efficiency can be improved by the temperature adjuster 29.

According to this embodiment, since the hydrogen storage tank 20 can be made compact and lightweight, it is made possible to save an installation space and a weight load in a vehicle. Further, the pressure vessel 21 is air-tightly filled with the hydrogen storage alloy powder 22 of the invention, so that there is no need to apply ultrahigh pressure and it becomes possible to absorb and desorb hydrogen at a lower pressure than before. Consequently, the thickness of the wall of the pressure vessel 21 can be made thin.

Fourth Embodiment

Hydrogen Absorption and Desorption Method

The hydrogen storage alloy powder 22 is packed and sealed in the inside of the pressure vessel 21 shown in FIG. 3. Hydrogen gas or hydrogen-containing gas at a predetermined pressure and temperature is introduced into the pressure vessel 21 through the hydrogen supply port 27 and the gas introduction port 23 to absorb hydrogen gas in the hydrogen storage alloy powder 22. In this embodiment, the pressure and the temperature at the time of hydrogen absorption may be set at 3 MPa and 200° C., respectively. After that, hydrogen is desorbed from the hydrogen storage alloy powder 22 under conditions of predetermined pressure and temperature to release hydrogen gas out of the pressure vessel 21 through the hydrogen release port 28. In this embodiment, the pressure and the temperature at the time of hydrogen desorption may be set at 0.01 MPa and 250° C., respectively.

EXAMPLES

Hereinafter, the invention will be described by comparing Examples and Comparative Examples.

Examples 1 to 18 and Comparative Examples 1 to 8

Example 1

Production of Hydrogen Storage Alloy

Starting materials of the respective elements were weighted to give the compositions shown in Table 1 and after being mixed, the materials were melted by high frequency induction heating under an argon atmosphere to obtain ingots. Thereafter, these alloy ingots were heated at almost their melting points in an argon atmosphere. The obtained alloys were pulverized to have an average particle diameter of 100 μm or smaller to obtain hydrogen storage alloy powders. The compositions of the obtained alloy powders were confirmed by ICP (Inductively Coupled Plasma) atomic emission spectrometry.

<Evaluation of Hydrogen Absorption and Desorption Property>

Each of the obtained alloy powders was set in a pressure vessel and hydrogenated at a hydrogen partial pressure of 1.2 MPa and temperature of 200° C. Further, the obtained hydride powder was packed in a platinum tray and subjected to thermogravimetric analysis to evaluate the hydrogen absorption and desorption property. The atmosphere was adjusted to be argon gas and hydrogen partial pressure was controlled to be zero. The measurement conditions at that time are described below.

The measurement was carried out under conditions of heating from normal temperature to 320° C. at 1.5° C./min heating rate and the amount (% by weight) of absorbed hydrogen was measured as the amount of the maximum weight decrease which was confirmed together with an exothermic peak of hydrogen desorption reaction. It was also confirmed that the released gas was entirely hydrogen.

As is clear from Table 1, the alloy samples of Examples 1 to 18 were found excellent in the hydrogen absorption and desorption property as compared with those of Comparative Examples 1 to 8 and accordingly, it is made clear that the alloys of these Examples were provided with remarkably improved efficacious hydrogen storage amounts.

<Evaluation of Crystal Structure>

The crystal structure of each obtained alloy powder was measured by X-ray diffraction using CuKα ray and microanalysis. As a result, each obtained hydrogen storage alloy was found to be a crystal of a hexagonal system $MgZn_2$ type with space group of $P6_3/mmc$ and containing Laves phase of C14 type crystal structure. The lattice constants "a" and "c" of each obtained hydrogen storage alloy were 6 Å (0.6 nm) and 10 Å (1 nm), respectively. The similar structure analysis was carried out for each hydrogen storage alloy after the differential heat/thermogravimetric analysis to find the alloy had C14 type structure of a hexagonal crystal system $MgZn_2$ with space group of $P6_3/mmc$. Accordingly, it was confirmed that all of the obtained hydrogen storage alloys did not cause crystal structure disintegration even after hydrogen absorption and desorption.

Examples 2 to 18 and Comparative Examples 1 to 8

Alloy samples of Examples 2 to 18 and Comparative Examples 1 to 8 were produced in the same manner as Example 1, except that the respective element amounts were changed to give the compositions as shown in Table 1 and the hydrogen absorption and desorption property of each sample was evaluated. The results are shown in Table 1.

TABLE 1

Hydrogen desorption property of alloys

| | | Type of hydrogen storage alloy | Hydrogen desorption amount (% by mass) |
|---|---|---|---|
| Comparative Example | 1 | $Mg_2Ni$ | 0.5 |
| | 2 | $MgNi_2$ | 0.0 |
| | 3 | $MgNi_{1.5}V_{1.5}$ | 1.5 |
| | 4 | $(Ca_{0.3}Mg_{0.7})(Li_{0.5}Co_{0.05}Ni_{0.45})_{2.0}$ | 2.1 |
| | 5 | $(Ca_{0.8}La_{0.2})(Li_{0.1}Sn_{0.6}Ni_{0.3})_{2.0}$ | 2.5 |
| | 6 | $(Ca_{0.9}Y_{0.1})Li_{2.0}$ | 2.2 |
| | 7 | $(Ca_{0.8}Hf_{0.2})(Li_{0.45}Al_{0.05}Ni_{0.5})_{1.7}$ | 1.7 |
| | 8 | $(Ca_{0.7}Ce_{0.3})(Li_{0.4}Mn_{0.1}Ni_{0.5})_{2.3}$ | 1.9 |
| Example | 1 | $(Ca_{0.7}Mg_{0.3})(Li_{0.5}Ni_{0.5})_{2.0}$ | 4.2 |
| | 2 | $(Ca_{0.8}La_{0.15}Zr_{0.05})(Li_{0.4}Pt_{0.1}Co_{0.1}Ni_{0.4})_{1.8}$ | 4.4 |
| | 3 | $(Ca_{0.6}Mg_{0.2}La_{0.2})(Li_{0.1}Mn_{0.1}Cr_{0.1}Cu_{0.1}B_{0.1}Ni_{0.5})_{2.1}$ | 4.4 |
| | 4 | $(Ca_{0.6}Y_{0.3}Ti_{0.1})(Li_{0.1}Fe_{0.15}W_{0.05}Sn_{0.05}Mo_{0.03}Si_{0.02}Ni_{0.6})_{2.0}$ | 4.3 |
| | 5 | $(Ca_{0.7}Hf_{0.26}Sr_{0.03}Nb_{0.01})(Li_{0.5}Al_{0.04}Pd_{0.1}Bi_{0.01}Pb_{0.05}Sb_{0.1}Ni_{0.2})_{1.9}$ | 4.1 |
| | 6 | $(Ca_{0.85}Cs_{0.1}Ti_{0.04}Ta_{0.01})(Li_{0.5}Ag_{0.1}Cd_{0.06}B_{0.01}Ge_{0.01}Zn_{0.01}Ga_{0.01}Ni_{0.3})_{2.0}$ | 4.0 |
| | 7 | $(Ca_{0.75}Ce_{0.2}Sc_{0.05})(Li_{0.3}Mo_{0.07}Co_{0.2}Bi_{0.03}Ni_{0.4})_{2.1}$ | 4.1 |
| | 8 | $(Ca_{0.7}Pr_{0.2}Na_{0.1})(Li_{0.2}Sn_{0.1}Si_{0.1}Ni_{0.3})_{2.2}$ | 4.3 |
| | 9 | $(Ca_{0.6}Nd_{0.2}Lu_{0.2})(Li_{0.2}Ge_{0.01}Co_{0.1}Pd_{0.09}Ni_{0.6})_{2.0}$ | 4.1 |
| | 10 | $(Ca_{0.6}Sm_{0.2}Ba_{0.2})(Li_{0.4}Mn_{0.1}Pb_{0.1}Zn_{0.1}Ga_{0.1}Ni_{0.2})_{2.1}$ | 4.3 |
| | 11 | $(Ca_{0.87}Pm_{0.1}V_{0.03})(Li_{0.7}Sn_{0.1}Cu_{0.06}Ag_{0.04}Ni_{0.1})_{1.9}$ | 4.0 |
| | 12 | $(Ca_{0.8}Eu_{0.1}Yb_{0.1})(Li_{0.1}In_{0.05}Ag_{0.05}Ni_{0.8})_{2.1}$ | 4.2 |
| | 13 | $(Ca_{0.7}Gd_{0.2}Er_{0.1})(Li_{0.2}Sn_{0.1}Ag_{0.1}Cd_{0.01}Ga_{0.08}B_{0.01}Ni_{0.5})_{2.2}$ | 4.0 |
| | 14 | $(Ca_{0.9}Tb_{0.05}Mg_{0.05})(Li_{0.05}Al_{0.03}Co_{0.02}Pd_{0.01}Ni_{0.9})_{1.8}$ | 4.2 |
| | 15 | $(Ca_{0.9}Dy_{0.07}Tm_{0.03})(Li_{0.3}Fe_{0.04}Zn_{0.03}Sb_{0.02}Pt_{0.01}Ni_{0.6})_{2.0}$ | 4.1 |
| | 16 | $(Ca_{0.6}Ho_{0.2}Mg_{0.2})(Li_{0.2}Mn_{0.1}Ge_{0.1}Cu_{0.09}W_{0.01}Ni_{0.5})_{2.1}$ | 4.0 |
| | 17 | $(Ca_{0.9}Mg_{0.35}K_{0.05})(Li_{0.5}Ni_{0.3}Ru_{0.1}Au_{0.1})_{1.9}$ | 4.0 |
| | 18 | $(Ca_{0.7}Mg_{0.2}Rb_{0.1})(Li_{0.3}Ni_{0.6}Ir_{0.1})_{2.1}$ | 4.1 |

As is clear from Table 1, the hydrogen storage alloys of Examples 1 to 18 having a hexagonal crystal structure and the compositions as defined by the above-mentioned formula (1) were found to have high hydrogen desorption ratios. Accordingly, it was confirmed that the alloys of Examples 1 to 18 had large hydrogen absorption and desorption amounts and excellent hydrogen absorption and desorption properties. That is, these alloys can remarkably improve the efficacious hydrogen storage amount.

On the other hand, the hydrogen storage alloys of Comparative Examples 1 to 8 were found to have low hydrogen desorption ratios as compared with those of Examples 1 to 18.

According to the invention, there is provided a hydrogen storage alloy excellent in the hydrogen absorption and desorption property. Further, there are also provided a hydrogen separation membrane, a hydrogen storage tank, and a hydrogen absorption and desorption method using the hydrogen storage alloy.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A hydrogen storage alloy including a composition defined by the following formula:

$$(Ca_{1-X}L_X)(Li_{1-Y-Z}M_YNi_Z)_m$$

wherein the L denotes one or more elements selected from the group consisting of Na, K, Rb, Cs, Mg, Sr, Ba, Sc, Ti, Zr, Hf, V, Nb, Ta, La, Ce, Pr, Nd, Pm, Sm, Eu, Gd, Tb, Dy, Ho, Er, Tm, Yb, and Lu; the M denotes one or more elements selected from the group consisting of Cr, Mo, W, Mn, Fe, Ru, Co, Ir, Ni, Pd, Pt, Cu, Ag, Au, Zn, Cd, B, Al, Ga, In, Si, Ge, Sn, Pb, Sb, Bi, and S; and the mole ratios X, Y, Z, and m respectively satisfy the following: $0 < X \leq 0.4$, $0 \leq Y \leq 0.4$, $0.1 \leq Z \leq 0.4$, and $1.8 \leq m \leq 2.2$.

2. The alloy according to claim 1 having a hexagonal system crystal structure with a space group of $P6_3/mmc$.

3. The alloy according to claim 2, wherein the hexagonal system crystal structure is $MgZn_2$ type C14 crystal Laves structure.

4. A hydrogen separation membrane which selectively separates hydrogen from a hydrogen-containing gas, the membrane containing a hydrogen storage alloy including a composition defined by the following formula:

$$(Ca_{1-X}L_X)(Li_{1-Y-Z}M_YNi_Z)_m$$

wherein the L denotes one or more elements selected from the group consisting of Na, K, Rb, Cs, Mg, Sr, Ba, Sc, Ti, Zr, Hf, V, Nb, Ta, La, Ce, Pr, Nd, Pm, Sm, Eu, Gd, Tb, Dy, Ho, Er, Tm, Yb, and Lu; the M denotes one or more elements selected from the group consisting of Cr, Mo, W, Mn, Fe, Ru, Co, Ir, Ni, Pd, Pt, Cu, Ag, Au, Zn, Cd, B, Al, Ga, In, Si, Ge, Sn, Pb, Sb, Bi, and S; and the mole ratios X, Y, Z, and m respectively satisfy the following: $0 < X \leq 0.4$, $0 \leq Y \leq 0.4$, $0.1 \leq Z \leq 0.4$, and $1.8 \leq m \leq 2.2$.

5. The membrane according to claim 4, wherein the hydrogen storage alloy has a hexagonal system crystal structure with a space group of $P6_3/mmc$.

6. The membrane according to claim 5, wherein the hexagonal system crystal structure is $MgZn_2$ type C14 crystal Laves structure.

7. A hydrogen storage tank comprising:

a pressure vessel having a hydrogen gas lead-in port; and a hydrogen storage alloy contained in the pressure vessel and including a composition defined by the following formula:

$(Ca_{1-X}L_X)(Li_{1-Y-Z}M_Y Ni_Z)_m$ wherein the L denotes one or more elements selected from the group consisting of Na, K, Rb, Cs, Mg, Sr, Ba, Sc, Ti, Zr, Hf, V, Nb, Ta, La, Ce, Pr, Nd, Pm, Sm, Eu, Gd, Tb, Dy, Ho, Er, Tm, Yb, and Lu; the M denotes one or more elements selected from the group consisting of Cr, Mo, W, Mn, Fe, Ru, Co, Ir, Ni, Pd, Pt, Cu, Ag, Au, Zn, Cd, B, Al, Ga, In, Si, Ge, Sn, Pb, Sb, Bi, and S; and the mole ratios X, Y, Z, and m respectively satisfy the following: $0 < X \leq 0.4$, $0 \leq Y \leq 0.4$, $0.1 \leq Z \leq 0.4$, and $1.8 \leq m \leq 2.2$.

8. The tank according to claim 7, wherein the hydrogen storage alloy has a hexagonal system crystal structure with a space group of $P6_3/mmc$.

9. The tank according to claim 8, wherein the hexagonal system crystal structure is $MgZn_2$ type C14 crystal Laves structure.

10. A hydrogen absorption and desorption method comprising:

storing a hydrogen storage alloy powder in the inside of a pressure vessel having a hydrogen gas lead-in port;

introducing hydrogen gas or hydrogen-containing gas at a predetermined pressure and temperature into the pressure vessel through the lead-in port to absorb the hydrogen gas or hydrogen-containing gas in the hydrogen storage alloy; and desorbing hydrogen from the hydrogen storage alloy under predetermined pressure and temperature conditions, the hydrogen storage alloy including a composition defined by the following formula:

$(Ca_{1-X}L_X)(Li_{1-Y-Z}M_Y Ni_Z)_m$ wherein the L denotes one or more elements selected from the group consisting of Na, K, Rb, Cs, Mg, Sr, Ba, Sc, Ti, Zr, Hf, V, Nb, Ta, La, Ce, Pr, Nd, Pm, Sm, Eu, Gd, Tb, Dy, Ho, Er, Tm, Yb, and Lu; the M denotes one or more elements selected from the group consisting of Cr, Mo, W, Mn, Fe, Ru, Co, Ir, Ni, Pd, Pt, Cu, Ag, Au, Zn, Cd, B, Al, Ga, In, Si, Ge, Sn, Pb, Sb, Bi, and S; and the mole ratios X, Y, Z, and m respectively satisfy the following: $0 < X \leq 0.4$, $0 \leq Y \leq 0.4$, $0.1 \leq Z \leq 0.4$, and $1.8 \leq m \leq 2.2$.

11. The method according to claim 10, wherein the hydrogen storage alloy has a hexagonal system crystal structure with a space group of $P6_3/mmc$.

12. The method according to claim 11, wherein the hexagonal system crystal structure is $MgZn_2$ type C14 crystal Laves structure.

* * * * *